United States Patent [19]

Ando et al.

[11] Patent Number: 4,553,817
[45] Date of Patent: Nov. 19, 1985

[54] AUTOMATIC AND MANUAL FOCUSING EXCHANGEABLE LENS ASSEMBLY

[76] Inventors: Makoto Ando, 21-308, 3-Ban, 2-Cho, Chayama-Dai, Sakai-Shi, Osaka-Fu; Tsuneyo Metabi, 12-306, 29-Ban, 1-Cho, Harumi-Dai, Sakai-Shi, Osaka-Fu; Yukio Miki, 560-4, Horiage-Cho, Sakai-Shi, Osaka-Fu; Takeshi Egawa, 1789-107, Zinenda, Hannan-Cho, Sennan-Gun, Osaka-Fu, all of Japan

[21] Appl. No.: 481,933

[22] Filed: Apr. 4, 1983

[30] Foreign Application Priority Data

Apr. 8, 1982 [JP] Japan .................................. 57-59278
May 27, 1982 [JP] Japan .............................. 57-78823[U]

[51] Int. Cl.⁴ .......................... G02B 7/10; G03B 13/22; G03B 3/00
[52] U.S. Cl. .................................... 350/255; 354/286; 354/400
[58] Field of Search ...................... 350/255; 354/195.1, 354/286, 400

[56] References Cited

U.S. PATENT DOCUMENTS

| | | | |
|---|---|---|---|
| 4,160,590 | 7/1979 | Reynard | 354/195 |
| 4,239,357 | 12/1980 | Iida | 354/25 |
| 4,272,174 | 6/1981 | Teramoto et al. | 354/195 |
| 4,309,077 | 1/1982 | Tomori | 350/255 |
| 4,413,894 | 11/1983 | Miko et al. | 350/255 |
| 4,461,544 | 7/1984 | Isobe et al. | 350/255 |

FOREIGN PATENT DOCUMENTS 50-151144 12/1975 Japan .

Primary Examiner—John K. Corbin
Assistant Examiner—William Propp
Attorney, Agent, or Firm—Watson, Cole, Grindle and Watson

[57] ABSTRACT

An exchangeable lens assembly detachably mountable on a camera body having an automatic focusing device is selectively capable of either automatic focus adjustment by the operation of the automatic focusing device or manual focus adjustment by a manual operation. In two of the embodiments, the change-over between the automatic focus adjustment and the manual focus adjustment is made by operation of a change-over member provided on a stationary barrel separately from a manual focusing ring. A driven shaft coupled with a focus adjusting mechanism is disengaged from a driving shaft of the automatic focusing device in the case of the manual focus adjustment. In the remaining embodiments, a manual focusing ring rotatable and axially shiftable relative to a stationary barrel is axially shifted between an automatic focusing position and a manual focusing position for the change-over. When the ring is shifted to the automatic focusing position, a driven shaft coupled with a focus adjusting mechanism is engaged with a driving shaft of the automatic focusing device and the ring is un-coupled from the focus adjusting mechanism. When the ring is shifted to the manual focusing position, the engagement between the driven and driving shafts is interrupted and the ring is coupled with the focus adjusting mechanism by frictional engagement due to elastic deformation of a resilient member.

14 Claims, 36 Drawing Figures

AUTOMATIC AND MANUAL FOCUSING EXCHANGEABLE LENS ASSEMBLY

BACKGROUND OF THE INVENTION

1. Field of the Invention

The present invention relates to exchangeable lens assemblies for use with an optical apparatus such as a camera body or a projector body including an automatic focusing device and more particularly it relates to such exchangeable lens assemblies selectively adjustable for focusing either by manual operation or by operation of the automatic focusing device of the optical apparatus.

2. Description of Prior Art

Japanese patent laid open publication No. Sho. 50-151144 published on Dec. 4, 1975 discloses a camera focusing system which enables both manual focus adjustment and automatic focus adjustment. The system includes an automatic focusing device having a driving shaft formed with a gear, and a lens assembly having a focus adjusting mechanism operable for focus adjustment of an optical system and a manual focusing ring axially shiftable between two predetermined positions. With the manual focusing ring being at either one of the two positions, either the manual focusing ring or the driving shaft is selectively coupled to the focus adjusting mechanism to the exclusion of the other, enabling smooth manual or automatic focusing operation. However, the Japanese patent laid-open publication fails to disclose how the system can apply to an exchangeable lens assembly detachably mountable on a camera body which is to include the automatic focusing device. For example, it lacks concrete disclosure of the manner of disconnecting the driving shaft from a drive motor of the automatic focusing device if the lens assembly is separated from the camera.

U.S. Pat. No. 4,309,077 discloses a lens assembly of the exchangeable type which is selectively adjustable either by manual operation or by an operation of an automatic focusing device included in a camera body on which the lens assembly is detachably mountable. With the lens assembly having been mounted on the camera body, the automatic focusing device is always coupled to a focus adjusting mechanism of the lens assembly whereas a manual focusing ring is coupled to the focus adjusting mechanism only when it is shifted to a particular axial position and then rotated to a particular angular position. Accordingly, the operation required for the changeover from automatic focus adjustment to manual focus adjustment is troublesome.

Moreover, in the case of the manual focus adjustment, the automatic focusing device of the camera body unnecessarily resists against rotation of the manual focusing ring, giving unfavorable operational feeling to a camera operator, because the coupling between the automatic focusing device and the focus adjusting mechanism is always maintained once the lens assembly is mounted on the camera body. The coupling between the automatic focusing device and the focus adjusting mechanism in the case of the manual adjustment also causes a drive motor included in the automatic focusing device to be forcibly rotated so that an undesirable electromotive force is generated. Additionally, a gear transmission included in the automatic focusing device for transmitting the motor rotation to the focus adjusting mechanism generates unpleasant sounds due to engagements of gears being rotated, and furthermore freedom of design is restricted because a reduction gear device comprising of a worm gear and a worm wheel, which allows only one way drive transmission, cannot be used in the gear transmission.

U.S. Pat. No. 4,274,174 discloses a lens assembly of the exchangeable type which includes a pair of focus adjusting mechanisms, one being coupled to a manual focusing ring for manual focus adjustment and the other being capable of been coupled to an automatic focusing device of a camera body for automatic focus adjustment when the lens assembly is mounted on the camera body. In the embodiments disclosed, the lens assembly is provided with a change-over member separately from a manual focusing ring for change-over between manual focus adjustment and automatic focus adjustment and the change-over to the automatic focus adjustment by the operation of the change-over member is made possible with the manual focus adjusting ring being rotated to a particular position as similar to the case of the disclosure of U.S. Pat. No. 4,309,077. Additionally, the construction of the lens assembly is complicated and costly because of the inclusion of the two focus adjusting mechanisms.

A lens assembly of the exchangeable type for use with a camera body having an automatic focusing device has been also proposed by copending Miki et al. U.S. patent application Ser. No. 392,326 filed on June 25, 1982, now U.S. Pat. No. 4,413,894 and co-assigned to the same assignee. With the lens assembly proposed in this patent, a single focus adjusting mechanism is provided for both manual focus adjustment and automatic focus adjustment, and, when a manual focusing ring is shifted to a particular axial position for automatic focus adjustment, a driven shaft coupled with the focus adjusting mechanism is shifted to an engaging position to engage a driving shaft of the automatic focusing device of the camera body and at the same time the manual focusing ring is uncoupled from the focus adjusting mechanism. In contrast, when the manual focusing ring is shifted to another particular axial position for manual focus adjustment, the driven shaft is shifted to a disengaging position to disengage from the driving shaft while the manual focusing ring is coupled with the focus adjusting mechanism. Accordingly the lens assembly is relatively simple in construction and free from the disadvantages caused by coupling of the automatic focusing device with the focus adjusting mechanism even in the case of the manual focus adjustment in U.S. Pat. No. 4,309,077. However, as it is constructed such that the coupling between the manual focusing ring and the focus adjusting mechanism in the case of the manual focus adjustment is achieved by engagement of a pair of rigid gears one of which is shifted relative to the other in the direction parallel to the optical axis, there occurs a case where the gears cannot engage one another due to failure of alignment of their gear teeth. In such a condition rotation of the manual focusing ring cannot be transmitted to the focus adjusting mechanism, resulting in failure of the manual focus adjustment.

Meanwhile the above prior art lens assemblies except that disclosed in U.S. Pat. No. 4,272,174 are common in that the change-over between the manual focus adjustment and the automatic focus adjustment is made by axial operation of a manual focusing ring which is rotated for manual focus adjustment. This is advantageous in that the change-over operation and the manual focusing operation are made without separating camera user's fingers from the manual focusing ring but disadvantageous in that, if the manual focusing ring is axially shifted by application of an axial force during the manual focusing operation, there occurs a failure of the manual focus adjustment because of uncoupling of the manual focusing ring from the focus adjusting mechanism. To avoid such a failure, the coupling between the manual focusing ring and the focus adjusting mechanism must be long enough in the axial direction and a large distance must be provided between the axial position of the manual focusing ring for manual focus adjustment and that for automatic focus adjustment. Additionally, for example in the case of the lens assembly disclosed in the aforementioned U.S. Pat. No. 4,413,894 there is a disadvantage that indication of the camera-to-object distance to which the optical system is adjusted cannot be made by use of a distance scale and an index therefor because the manual focusing ring is coupled with the focus adjusting mechanism at any angular position.

SUMMARY OF THE INVENTION

It is accordingly an object of the present invention to provide an improved lens assembly of the exchangeable type for use with an optical apparatus such as a camera body or a projection body having an automatic focusing device.

It is another object of the present invention to provide a lens assembly of the exchangeable type which enables change-over between manual focus adjustment and automatic focus adjustment by operation of a manual change-over member provided separately from a manual focusing ring to avoid failure of manual focus adjustment due to inadvertent uncoupling of the manual focusing ring from a focus adjusting mechanism as well as to facilitate indication of the camera-to-object distance by use of a distance scale and an index therefor.

It is still another object of the present invention to provide a lens assembly of the exchangeable type in which a manual focus ring is commonly used as a change-over member for the change-over between manual focus adjustment and automatic focus adjustment and which can always achieve coupling between the manual focusing ring and the focus adjusting mechanism at any angular position of the manual focusing ring.

In two preferred embodiments of the present invention, a manual change-over member is provided on a stationary barrel and a manual focusing ring rotatable relative to the stationary barrel is coupled with a focus adjusting mechanism which is also coupled with a driven shaft engageable with and disengageable from a driving shaft of an automatic focusing device of a camera body. An interlocking means interlocking the change-over member with the driven shaft shifts the driven shaft to an engaging position where a rear end of the driven shaft can engage a front end of the driving shaft when the change-over member is operated to an automatic focusing position and to a disengaging position where the rear end of the driven member disengages from the front end of the driving member when the change-over member is operated to a manual focusing position. Manual focus adjustment is effected by rotation of the manual focusing ring and automatic focus adjustment is effected by rotation of the driven shaft engaging the driving shaft of the automatic focusing device. As the change-over member is provided on the stationary barrel separately from the manual focusing ring, the coupling between the manual focusing ring and the focus adjusting mechanism is maintained independently of the change-over between the manual focus adjustment and the automatic focus adjustment and accordingly it becomes possible to indicate the camera-to-object distance to which the optical system of the lens assembly is adjusted, by use of a scale member and an index therefor. Thus one of the scale member and the index may be provided on the manual focusing ring and the other may be provided on the stationary barrel.

In the remaining preferred embodiments of the present invention, a manual focusing ring is rotatable and axially shiftable relative to a stationary barrel and change-over between manual focus adjustment and automatic focus adjustment is made in response to the axial shift of the manual focusing ring between a manual focusing position and an automatic focusing position. A driven shaft engageable with and disengageable from a driving shaft of an automatic focusing device of a camera body is coupled with a focus adjusting mechanism. When the manual focusing ring is axially shifted to the automatic focusing position, an interlocking means interlocking the manual focusing ring with the driven shaft shifts the driven shaft to an engaging position where a rear end of the driven shaft engages a front end of the driving shaft of an automatic focusing device of a camera body and at the same time a coupling means releasably coupling the manual focusing ring with the focus adjusting mechanism uncouples the manual focusing ring from the focus adjusting mechanism. In contrast, when the manual focusing ring is shifted to the manual focusing position, the interlocking means shifts the driven shaft to a disengaging position where the rear end of the driven shaft disengages from the front end of the driving shaft and at the same time the coupling means couples the manual focusing ring with the focus adjusting mechanism. The coupling means includes a resilient member which is elastically deformable to achieve frictional engagement between the coupling means and the focus adjusting mechanism when the manual focusing ring is axially shifted to the manual focusing position. The coupling between the coupling member and the focus adjusting mechanism is always made possible because of the elastic deformation of the resilient member, so that the manual focus adjustment by rotation of the manual focusing ring can be effected without failure.

According to the present invention, the driven shaft is shiftable in the axial direction parallel to the optical axis of the optical system between the engaging and disengaging positions. The rear end of the driven shaft engageable with of the the front end of the driving shaft is located in or adjacent to a mount surface of the lens assembly.

The above and other features of the present invention will become apparent from the following description of the preferred embodiments taken in conjunction with the accompanying drawings.

BRIEF DESCRIPTION OF THE DRAWINGS

FIGS. 1 and 2 are longitudinal cross sectional views, with a lower half omitted, of a lens assembly according to a first embodiment of the present invention, wherein FIG. 1 shows the lens assembly being in the condition set for automatic focus adjustment together with a part of a camera body and FIG. 2 shows the lens assembly being in the condition set for manual focus adjustment;

FIGS. 6 and 7 are longitudinal cross sectional views, with a lower half omitted, of a lens assembly according to a second embodiment of the present invention, wherein FIG. 6 shows the lens assembly being in the condition set for automatic focus adjustment, and FIG. 7 shows the lens assembly being in the condition set for manual focus adjustment;

FIGS. 11 and 12 are longitudinal cross sectional views, with a lower half omitted, of a lens assembly according to a third embodiment of the present invention, wherein FIG. 11 shows the lens assembly being in the condition set for automatic focus adjustment together with a part of a camera body and FIG. 12 shows the lens assembly being in the condition set for manual focus adjustment;

DESCRIPTION OF PREFERRED EMBODIMENTS

Figure 1:
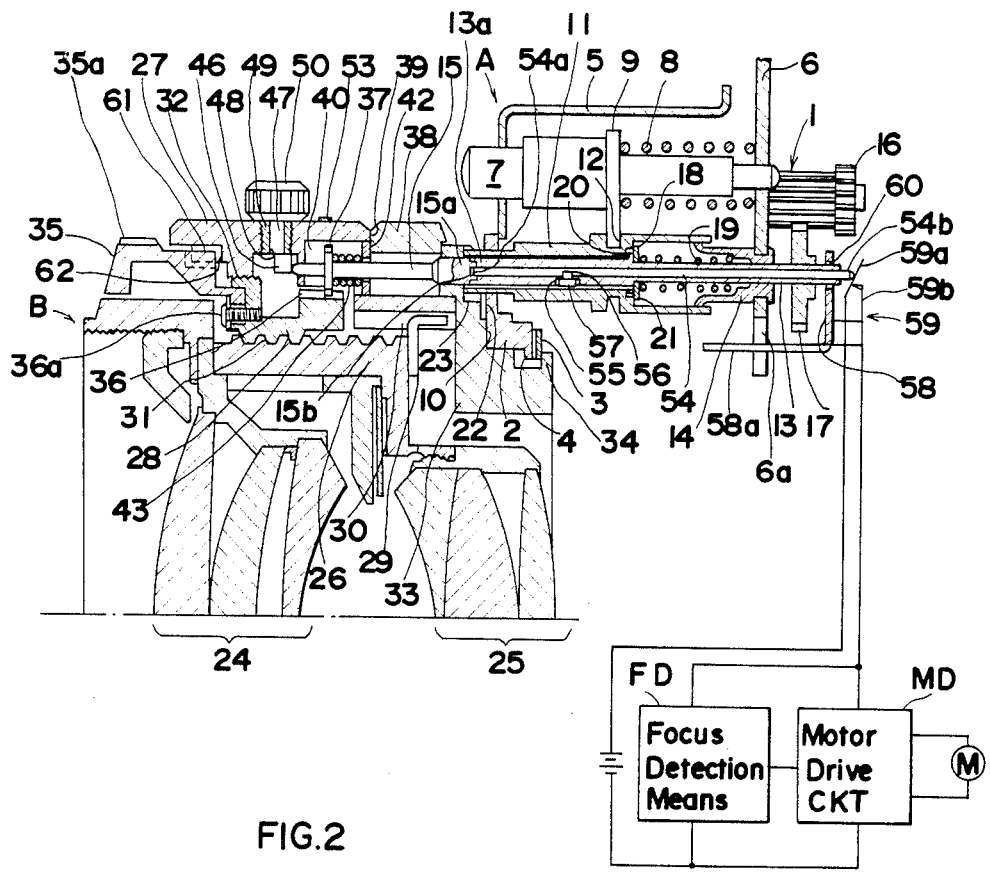
Figure 2:
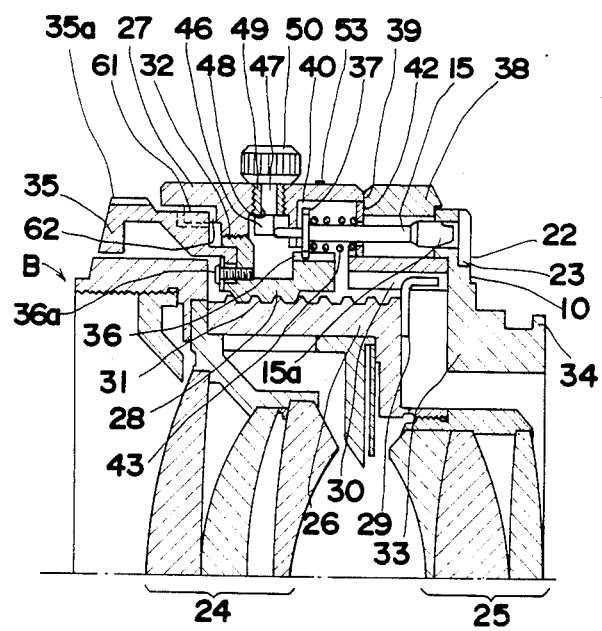
Figure 3:
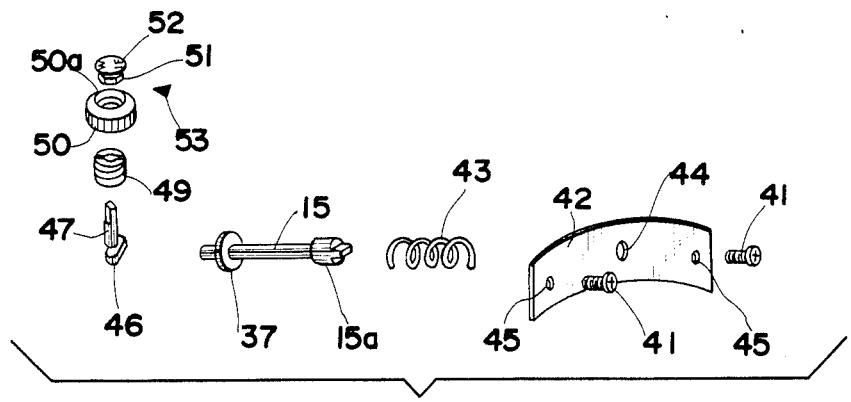
FIG. 3 is an exploded perspective view of essential elements of the lens assembly.

With reference to FIGS. 1 and 2, lens assembly B according to the first embodiment has been properly mounted on camera body A. A mount member 2 at the front of camera body A is provided with bayonet pawls 4, each having at its rear side a bayonet spring 3 which ensures steady coupling of lens assembly B with camera body A. Only one of the bayonet pawls is shown in the Figures. A front cover 5 integrally provided with mount member 2 is formed with a bore through which a position release member 7 projects and a front base plate 6 supports the positioning release member to allow its movement in the axial direction.

Positioning release member 7 is urged by a spring 8 to project forwardly out of front cover 5 and an engaging plate 9 having a radially outwardly extending portion is secured to the positioning release member. The radially outwardly extending portion of engaging plate 9 is in engagement with a peripheral groove 12 of a mount positioning member 11 so that the mount positioning member is interlocked with the engaging plate. Mount positioning member 11 is formed into a cylindrical shape and movable in the axial direction with its front end being fitted in a bore of mount member 2 and with its rear end being fitted around a bearing 14 fixed to front base plate 6.

A compression spring 8 located between front base plate 6 and positioning release member 7 urges the positioning release member and accordingly mount positioning member 11 forwardly, i.e., to the left in FIGS. 1 and 2. When lens assembly B has been properly mounted on camera body A, a positioning groove 23 formed on a mount surface 22 of the lens assembly aligns with mount positioning member 11 and the front end of the mount positioning member fits in the positioning groove under the force of spring 8 to properly position the lens assembly relative to the camera body. It should be understood that the front end of mount positioning member 11 is retracted from positioning groove 23 against the force of spring 8 when positioning release member 7 is depressed manually. This allows the lens assembly to be detached from the camera body.

An automatic focusing device 1 within the camera body includes a focus detection means FD for detecting the focus condition of the optical system included in lens assembly B by receiving and measuring light from an aimed object having passed through the optical system as well known in the art. Automatic focusing device 1 also includes a drive motor M and a motor drive circuit MD for driving the motor for normal or reverse rotation in accordance with signals generated by focus detection means FD. Motor M is coupled to a gear 16 by way of a not shown driving force transmission including a speed reduction device and intermediate gears. Gear 16 is rotatably supported on front base plate 6 and meshes with a gear 17 fixed to driving shaft 13. The normal or reverse rotation of motor M causes the optical system to be adjusted as hereinafter described. When the optical system is adjusted to focus on the aimed object, i.e., brought into an in-focus condition for the aimed object, focus detection means MD generates a signal for causing motor drive circuit MD to stop motor M.

Driving shaft 13 is loosely fitted in mount positioning member 14 to be freely movable in the axial direction and formed with a fixed flange 18. A movable flange loosely fitted around the driving shaft is urged by a compression spring 19 to abut on fixed flange 20, so that it urges driving shaft 13 forwardly. A stepped engaging surface 21 is formed at the inner peripheral surface of mount positioning member 11. This stepped engaging surface is engaged by fixed flange 20 of driving shaft 13 while lens assembly B is being detached from camera body A, preventing a front engaging end 13a of the driving shaft from projecting out of the front end of mount positioning member 11 under the force of spring 19. Thus, the front engaging end of the driving shaft is protected from damages which otherwise may be caused by its sliding contact with mount surface 22 of the lens assembly. In this connection it should be understood that the lens assembly must be rotated about the optical axis of the optical system for its detachment from the camera body as is well known in the art.

When the front end of mount positioning member 11 fits in positioning groove 23 as described above, driving shaft 13 is shifted forwardly under the force of spring 19, so that its front engaging end 13a becomes engageable with a rear engaging end 15a of a driven shaft 15 which is in positioning groove 23.

Rear engaging end 15a of the driven shaft is formed into a tapered projection of trapezoid shape in cross section and a tapered recess complementary to the tapered projection is formed at front engaging end 13a of the driving shaft. Such configurations of the two engaging ends allow smooth engagement and disengagement.

A signal pin 54 is inserted in driving shaft 13 to be movable in the axial direction. A stopper member 57 secured to the driving shaft by a screw 55 fits in a cutaway 56 of the signal pin to restrict the range of movement of the signal pin in the axial direction. Thus the signal pin is movable between a forwardmost position where its front end projects into the tapered recess at front engaging end 13a of the driving shaft and a rearmost position where its front end is completely retracted into the driving shaft. Behind gear 17 a switch mount plate 58 carrying a movable contact piece 59a and a fixed contact piece 59b of a switch 59 is supported on driving shaft 13 by means of a rotational direction slipping means 60 such as a bearing. Plate 58 has a forwardly extending arm 58a which fits in a vertical slot formed on front base plate 6 to prevent rotation of the plate 58 following the rotation of driving shaft 13. Movable contact piece 59a has a tendency to separate from fixed contact piece 59b and abuts on the rear end 54b of signal pin 54 to urge the signal pin toward the forwardmost position. Rear engaging end 15a of driven shaft 15 is formed with a guide recess 15b which can receive front end 54a of signal pin 54. When rear engaging end 15a of the driven shaft is about to engage front engaging end 13a of the driving shaft, front end 54a of the signal pin fits in guide recess 15b of the driven shaft and guides the engagement of front engaging end 13a with rear engaging end 15a. In this condition, signal pin 54 is pushed rearwardly against the action of movable contact piece 59a by the bottom of guide recess 15b so that the movable contact piece contacts fixed contact piece 59b. In contrast, if rear engaging end 15a of driven shaft 15 is retracted from positioning recess 23 as shown in FIG. 2 or if lens assembly B is detached from camera body A, signal pin 54 is allowed to move to the forwardmost position under the action of movable contact piece 59a, allowing the separation of the movable contact piece from fixed contact piece 59b, so that switch 59 is opened. Thus, switch 59 is closed and opened in dependence upon whether the coupling between driving shaft 13 and driven shaft 15 has been completed or not with lens assembly B being mounted on camera body A and accordingly constitutes a means for generating a signal indicative of the state of the coupling. This signal can be used to switch on and off focus detection means FD and motor drive circuit MD of automatic focus detection device 1. However, switch 59 and signal pin 54 may be replaced with an appropriate detection means which detects the axial movement of driving shaft 13 relative to front base plate 6. In this case guide recess 15b at the rear end of driven shaft 15 becomes unnecessary.

The optical system of lens assembly B comprises a front lens group 24 and a rear lens group 25 and is adjusted for focusing by movements of these two lens groups along the optical axis thereof. An inner sleeve 26 carrying front and rear lens groups 24 and 25 is supported relative to a stationary barrel 27 through a rotatable sleeve 28 so as to be movable only in the axial direction parallel to the optical axis of the optical system because a straight key 29 fixed to the inner sleeve fits in a straight groove formed on stationary barrel 27 to prevent rotation of the inner sleeve. Rotatable sleeve 28 is coupled with inner sleeve 26 and stationary barrel 27 by helicoid threads 31 and 32 respectively. Rotation of this rotatable sleeve causes its movement in the axial direction relative to stationary barrel 27 by the operation of helicoid thread 32 as well as causes movement of inner sleeve 26 in the same direction relative to the inner sleeve by the operation of helicoid thread 31. Thus, rotatable sleeve 28 together with helicoid threads 31 and 32 constitutes a focus adjusting mechanism of the so-called double helicoid threads type which can shift inner sleeve 26 by an amount of the lead of helicoid thread 31 added by that of helicoid thread 32.

Integrally provided on stationary barrel 27 are a mount member 33 having mount surface 22 and bayonet pawls 34 engageable with corresponding bayonet pawls 4 of mount member 2 of camera body A. A manual focusing ring 35 secured to the front of rotatable sleeve 28 by a screw 36a is formed with a manually operable portion 35a a whose diameter is slightly smaller than that of stationary barrel 27 and partially covered by the stationary barrel with the portion 35a exposed at the front of the stationary barrel. This makes intentional operation of ring 35 possible without difficulty but prevents inadvertent or accidental operation of ring 35 effectively. This effect becomes more remarkable when inner sleeve 26 has its front end located at the front of the manual focusing ring as shown in FIGS. 1 and 2.

Rotatable sleeve 28 has a gear 36 at its rear outer peripheral portion and driven shaft 15 has a gear 37 meshing with gear 36 for rotating rotable sleeve 28. Driven shaft 15 is supported by stationary barrel 27 for rotation and movement in the axial direction between an engaging position where rear engaging end 15a is located in positioning groove 23 and engageable with front engaging end 13a of driving shaft 13 and a disengaging position where the rear engaging end is retracted from the positioning groove and disengages from the front engaging end of the driving shaft. Gear 37 of driven shaft 15 is arranged in a hollow 40 of stationary barrel 27 which is formed in front of a groove 39 receiving a diaphragm setting ring 38. Hollow 40 is closed at its rear end by a spring support 42 secured to stationary barrel 27 by screws 41. A compression spring 43 interposed between gear 37 and spring support 42 urges driven shaft 15 forwardly toward the disengaging position. A through-hole 44 of spring support 42 is provided for allowing driven shaft 15 to extend therethrough while holes 45 of the spring support are provided for receiving screws 41.

Figure 4:
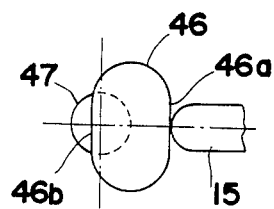
FIGS. 4 and 5 are schematic illustrations showing the relationship between an A/M change-over cam member and a driven shaft with the lens assembly being in the condition set for automatic focus adjustment and in the condition set for manual focus adjustment respectively.
Figure 5:
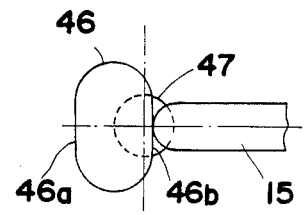

An automatic focusing and manual focusing change-over cam member (hereinafter called an A/M change-over cam member) 46 is located so as to be engaged by the front end of driven shaft 15 which is urged forwardly as described above. A/M change-over cam member 46 is oblong in plan view as shown in FIGS. 4 and 5 and has a flat cam surfaces 46a and 46b. A rotary shaft integrally provided eccentrically with A/M change-over cam member 46 is rotatably received in a bearing 49 which is threaded into a screw hole 48 formed on stationary barrel 27 in the radial direction. A change-over knob 50 has an oblong hole in which the upper portion of rotary shaft 47 fits. The knob is fixed to the rotary shaft by a nut 51 to be integral with the rotary shaft. Screw hole 48 is large enough to allow insertion of A/M change-over cam member 46, so that assembling of the A/M cam change-over member is made possible if bearing 49 is threaded into screw hole 48 after insertion of the A/M change-over cam member. When change-over knob 50 is rotated to position A/M change-over cam member 46 as shown in FIG. 4, flat cam surface 46a pushes the front end of driven shaft 15 rearwardly to shift the driven shaft to the engaging position. In contrast, when change-over knob 50 is rotated to position the A/M change-over cam member as shown in FIG. 5, flat cam surface 46b allows the driven shaft to move forwardly to the disengaging position under the force of spring 43. As the force of spring 43 acts on A/M change-over cam member 46 in the direction perpendicular to flat cam surfaces 46a and 46b and is directed to rotary shaft 47, the A/M changeover cam member is steadily held at the positions shown in FIGS. 4 and 5, so that change-over knob 50 can be also held at corresponding positions without the aid of any special holding means. A change-over indication plate 52 is stuck on the top of change-over knob 50 for indicating the change-over state in cooperation with an index 53 marked on stationary barrel 27.

Although not shown in FIGS. 1 to 5, a distance scale is provided on the outer peripheral surface of stationary barrel 27 along the circular direction and an index for the distance scale is provided on manual focusing ring 35.

For photographing a camera user mounts lens assembly B on camera body A. When the mounting completes, mount positioning member 11 fits in positioning groove 23 and driving shaft 13 is moved forwardly under the force of spring 19 as shown in FIG. 1.

If automatic focus adjustment is intended, change-over knob 50 is rotated to position A/M change-over cam member 46 as shown in FIG. 4, causing flat cam surface 46a of the A/M change-over cam member to shift driven shaft 15 rearwardly. Then rear engaging end 15a of the driven shaft 15 engages front engaging end 13a of driving shaft 13 which is at the engaging position. When the engagement is completed, the driven shaft is coupled with the driving shaft and at the same time signal pin 54 is pushed back to close switch 59. When automatic focusing device 1 starts operation in this condition in response to, for example, a shutter release operation, motor M is driven in the normal or reverse direction in accordance with the focus condition of the optical system of the lens assembly and driving shaft 13 is rotated correspondingly. The rotation of driving shaft 13 is transmitted to driven shaft 15 and further to rotatable sleeve 28 through gear 37 meshing with gear 36. Rotation of rotatable sleeve 28 then causes movement of inner sleeve 26 in the axial direction parallel to the optical axis of the optical system due to the operation of helicoid threads 31 and 32, whereby lens groups 24 and 25 are integrally moved for focus adjustment of the optical system. When the optical system is adjusted to an in-focus condition, focus detection means FD generates a signal causing motor drive circuit MD to stop motor M. Thus, automatic focus adjustment is completed. It should be understood that a shutter (not shown) in the camera body operates after completion of the automatic focus adjustment.

When change-over knob 50 is rotated to position A/M changeover cam member 46 as shown in FIG. 5, flat cam surface 46b allows driven shaft 15 to move forwardly under the force of spring 43, whereby rear engaging end 15a of the driven shaft disengages from front engaging end 13a of driving shaft 13 and rotatable sleeve 28 is uncoupled from the driving shaft. At the same time signal pin 54 is moved to the forwardmost position under the force of movable contact piece 59a a and switch 59 is opened to deactivate motor drive circuit MD and focus detection means FD.

In this condition, only manual focus adjustment is possible. If the camera operator operates operable portion 35a to rotate manual focusing ring 35 integrally secured to rotatable ring 28, inner sleeve 3 is moved in the axial direction parallel to the optical axis of the optical system and the focus condition of the optical system is adjusted.

It is to be noted that the rotation of driving shaft 13 during the automatic focus adjustment produces a force which tends to shift driven shaft 15 forwardly because rear engaging end 15a of the driven shaft and front engaging end 13a b of the driving shaft are of the trapezoidal shape in cross section as described earlier. However, flat cam surfaces 46a and 46b of A/M change-over cam member 46 resists against such tendency of the driven shaft 15 and thereby prevents accidental disengagement of the driven shaft from the driving shaft.

It is also to be noted that manual focusing ring 35 has a projection 61 which abuts a pair of stoppers 62 formed on the inner peripheral surface of stationary barrel 27 to restrict the rotational range of the ring, i.e., the range of the manual focus adjustment.

Figure 6:
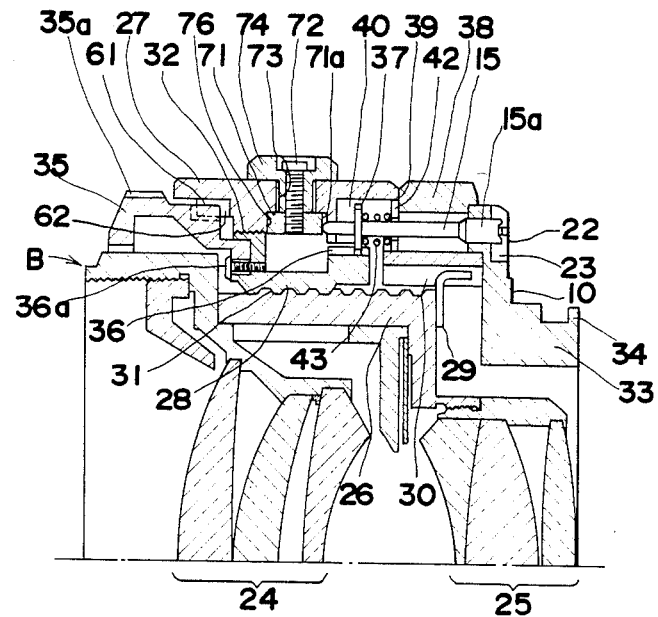
Figure 7:
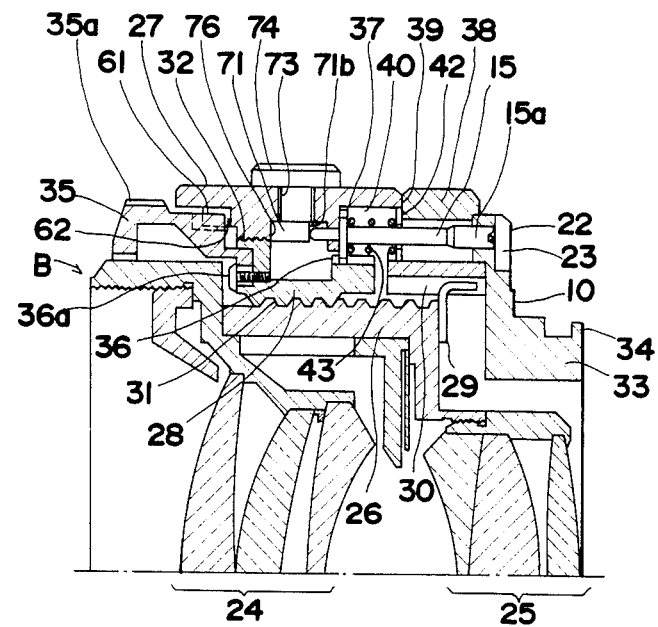
Figure 8:
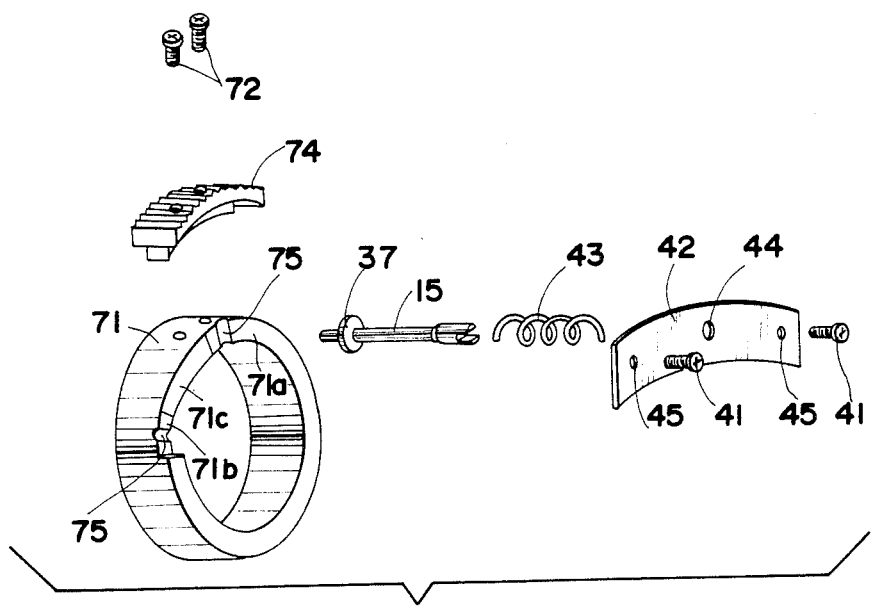
FIG. 8 is an exploded perspective view of essential elements of the lens assembly according to the second embodiment.
Figure 9:
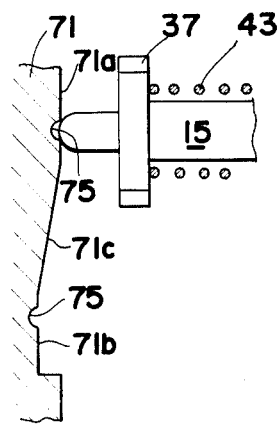
FIGS. 9 and 10 are schematic illustrations showing the relationship between an A/M cam ring and a driven shaft with the lens assembly according to the second embodiment being in the condition set for automatic focus adjustment and in the condition set for manual focus adjustment, respectively.
Figure 10:
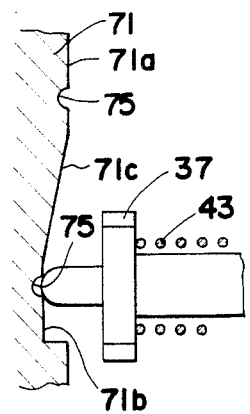

In the lens assembly according to the second embodiment shown in FIGS. 6 to 10, an A/M change-over cam ring 71 is rotatably received in a circular groove 76 formed on the inner peripheral surface of stationary barrel 27. At the rear end wall of A/M change-over cam ring 71, a flat cam surface 71a, an intermediate slant surface 71c and a flat cam surface 71b are provided in such order in the circular direction. As shown in FIGS. 8 to 10 flat cam surface 71a is higher than flat cam surface 71b and notches 75 are formed on the respective cam surfaces. A change-over knob 74 received in and projecting from a circular groove 73 formed on stationary barrel 27 is secured to the outer peripheral surface of A/M change-over cam ring 71 by screws 72. Flat cam surfaces 71a and 71b are perpendicular to the axial direction so as to ensure position restriction of driven shaft 15 which is urged by spring 43 to abut on the flat cam surfaces by its front end. Although driven shaft 15 receives frictional resistance at its front end due to the abutment on the flat cam surfaces, it can smoothly rotate because the frictional resistance is not so strong. Notches 75 formed on the flat cam surfaces, driven shaft 15 and spring 43 constitute click-stop means for steadily holding A/M change-over cam ring 71 at positions where the front end of driven shaft 15 aligns with the notches. In this connection notches 75 may be replaced with small holes or a special click-stop means which does not make use of the driven shaft may be provided independently. In practice the part of stationary barrel 27 located in front A/M change-over cam ring 71 and forming the front wall of circular groove 76 will be provided as an auxiliary ring member separably secured to the stationary barrel to facilitate assembly of the A/M change-over cam ring.

Now it will be apparent that change-over knob 74 is rotated to position A/M change-over cam ring 71 as shown in FIG. 9 if automatic focus adjustment is intended. Then driven shaft 15 is pushed back by flat cam surface 71a as shown in FIG. 6 and engages driving shaft 13 on the side of the camera body. If manual focus adjustment is intended, change-over knob 74 is rotated to position A/M change-over cam ring 71 as shown in FIG. 10, whereby driven shaft 15 is moved forwardly under the force of spring 43 as shown in FIG. 7 and abuts on flat cam surface 71b. In this condition driven shaft 15 disengages from driving shaft 13.

Although the lens assemblies according to the first and second embodiments are provided with change-over knob 50 or 71 separately from manual focusing ring 35, the lens assemblies according to the following embodiments are constructed such that a manual focusing ring also serves as a change-over member like knobs 50 and 71.

In FIGS. 11 to 36 which show lens assemblies according to the third to tenth embodiments, the same reference numerals are used for the same members as or having the same function as those of the first and second embodiments in principle.

Figure 11:
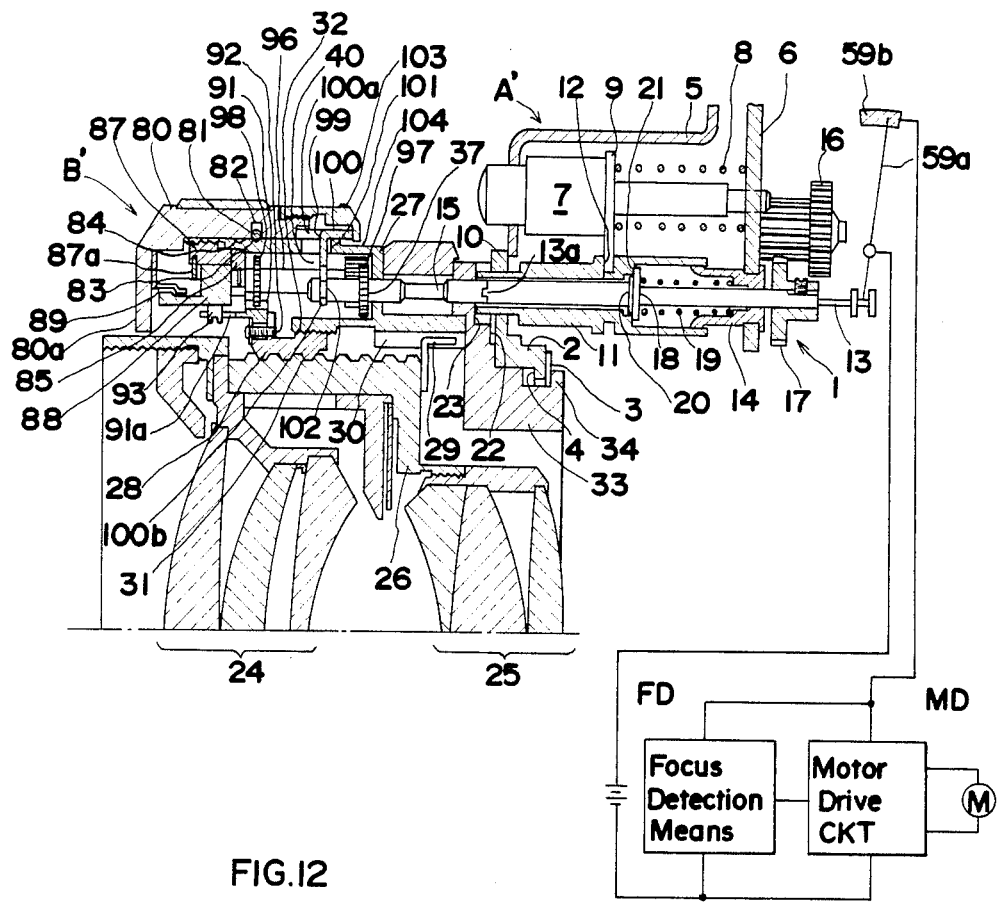

Lens assemblies B' of the third embodiment is shown in FIG. 11 together with a camera body A' on which the lens assembly is mounted. The construction of the camera body is different from that of camera body A in that no signal pin is provided within driving shaft 13. Instead thereof, the driving shaft is formed with a circular recess which receives one end of a pivotable movable contact piece 59a of switch 59. When the driving shaft is engaged with driven shaft 15 as shown in FIG. 11, movable contact piece 59a contacts a fixed contact piece 59b to close switch 59. In contrast, when the lens assembly is not mounted on the camera body, driving shaft 13 is moved forwardly from the position in FIG. 11 together with mount positioning member 11 under the force of spring 8, so that movable contact piece 59a is pivoted clockwise to separate from fixed contact piece 59b. Additionally, while the lens assembly is being mounted on the camera body, mount positioning member 11 and driven shaft 13 are pushed back by mount surface 22 of mount member 33 of the lens assembly. Thus movable contact piece 59a is pivoted counterclockwise to separate from fixed contact piece 59b. In these two cases switch 59 is opened and motor drive circuit MD is deactivated.

Lens assembly B' is provided with a manual focusing ring 80 supported on the outer peripheral surface of stationary barrel 27 for rotation about the optical axis of the optical system and for movement in the axial direction parallel to the optical axis. On an inner peripheral surface of manual focusing ring 80 a circular groove 82 is formed which receives a click spring 81. This spring is selectively and resiliently engageable with one of circular grooves 83 and 84 which are formed on the outer peripheral surface of stationary barrel 27 and spaced from one another in the direction of the optical axis. Thus the manual focusing ring can be held by the engagement of click spring 81 with one of circular grooves 83 and 84 at axially spaced two positions, i.e., at an automatic focusing position shown in FIGS. 11 and 13 and a manual focusing position shown in FIGS. 12 and 14.

Figure 12:
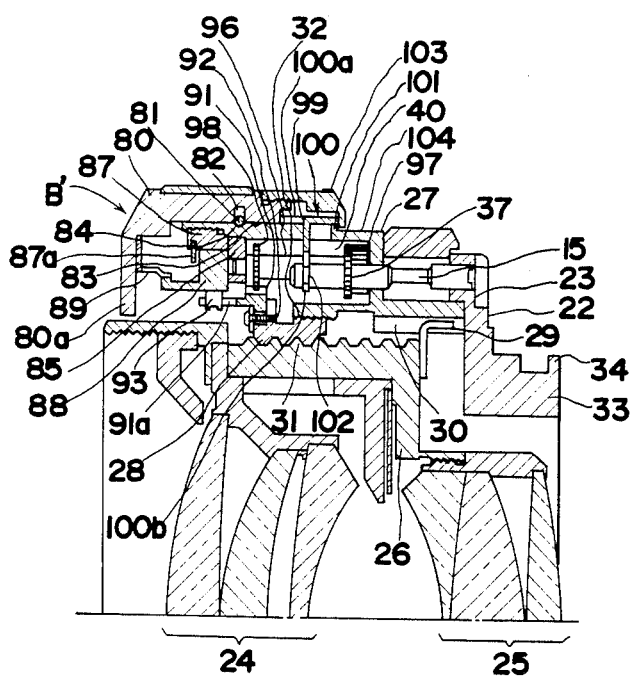
Figure 13:
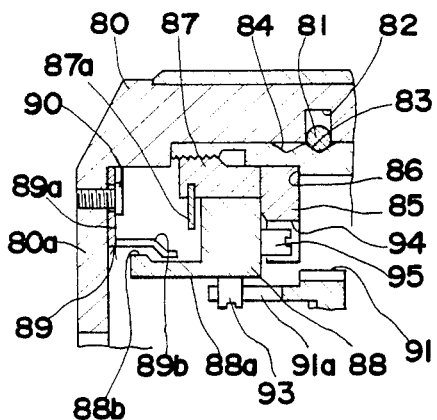
FIGS. 13 and 14 are enlarged fragmentary cross sectional views of a part of the lens assembly according to the third embodiment being in the conditions corresponding to FIGS. 11 and 12 respectively.
Figure 14:
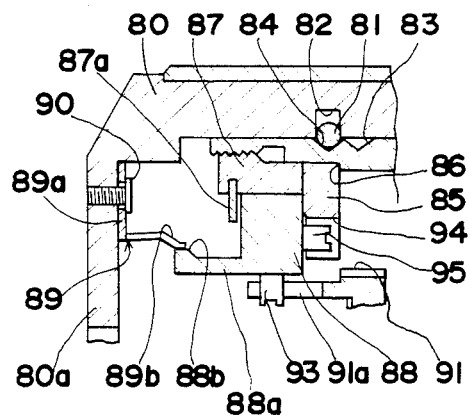
Figure 15:
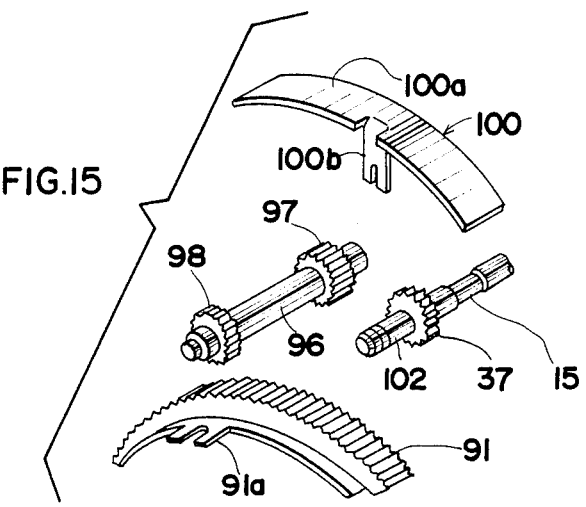
FIG. 15 is an exploded perspective view of essential elements of the lens assembly according to the third embodiment.
Figure 16:
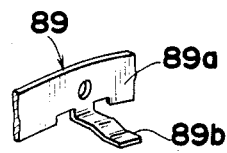
FIG. 16 is a perspective view of a resilient coupling member used in the third embodiment.

Supported on the inner peripheral surface of stationary barrel 27 is an auxiliary ring 85 which is sandwiched between a step portion 86 of the stationary barrel and a fastening ring 87 threaded with the stationary barrel, as best shown in FIGS. 13 and 14. An interlocking ring 88 having a forwardly extending sleeve 88a is supported on the inner peripheral surface of fastening ring 87 for rotation about the optical axis with its axial movement inhibited by auxiliary ring 85 and a snap ring 87a fixed to the fastening ring. The front end of manual focusing ring 80 is bent radially inwardly to form a brim 80a. A coupling member 89 made of a resilient metallic material is provided with a ring portion 89a secured to the rear wall of brim 80a by a screw 90 and a plurality of resilient engaging arms 89b extending rearwardly from ring portion 89a. Although only one of the engaging arms is shown in FIGS. 11 to 14 and 16, it should be understood that they are spaced from each other in the circular direction. The rear end of each of engaging arms 89b is frictionally engageable with a raised rim portion 88b formed at the front end of forwardly extending sleeve 88a of interlocking ring 88, only when manual focusing ring 80 is axially shifted to the manual focusing position where click spring 81 engages circular groove 84. A gear 91 having gear teeth on its outer periphery is secured to rotatable sleeve 28 by a screw 92 and a pin 93 affixed to the inner peripheral surface of interlocking ring 88 is in engagement with a fork 91a extending forwardly from gear 91 to rotate rotatable sleeve 28 in response to rotation of interlocking ring 88. The inner wall of auxiliary ring 85 is angularly cut-away to form a pair of stoppers 94 at opposite ends and another pin 95 engageable with these stoppers is affixed to the rear end of interlocking ring 88 to restrict the rotational range of interlocking ring 88. Thus focus adjustment of the optical system toward the outside of a normal distance range (from infinity to predetermined rear distance) is prevented by the engagement of pin 95 with stoppers 94.

In hollow 40 of stationary barrel 27 an intermediate shaft 96 extending parallel to the optical axis is rotatably supported by auxiliary ring 85 and stationary barrel 27. This intermediate shaft has a gear 97 at its rear end portion and a gear 98 at its front end portion. Gears 97 and 98 mesh with gear 37 and 91 respectively to transmit the rotation of driven shaft 15 to rotatable sleeve 28. A circular groove 99 is formed on the inner peripheral surface of manual focusing ring 80 facing stationary barrel 27 and an arciform base plate portion 100a of an interlocking member 100 is received in circular groove 99 for rotation about the optical axis. Interlocking member 100 is made of a metallic material and has a fork 100b bent radially inwardly from the base plate portion. Fork 100b is guided by a circular guide slot 101 formed on stationary barrel 27 and is in engagement with a circular groove 102 formed on the front end portion of driven shaft 15.

When automatic focus adjustment is intended, manual focusing ring 80 is shifted rearwardly to the manual focusing position shown in FIGS. 11 and 13. In this condition any one of resilient engaging arms 89b of coupling member 89 is incapble of engaging raised rim portion 88b of interlocking ring 88. On the other hand interlocking member 100 shifts driven shaft 15 rearwardly so that the driven shaft engages driving shaft 13 as shown in FIG. 11. As switch 59 is closed in this condition, motor drive circuit MD is rendered operative and therefore motor M is driven to rotate driving shaft 13 in response to a camera release operation if the optical system of the lens assembly is not adjusted to an in-focus condition. The rotation of driving shaft 13 is transmitted to intermediate shaft 96 through driven shaft 15 and further to rotatable sleeve 28, whereby the optical system is automatically adjusted for focusing due to the operation of helicoid threads 31 and 32. Although interlocking ring 88 is rotated together with rotatable sleeve 28, manual focusing ring 80 remains stationary and does not resist against the rotation of interlocking ring 88 because raised rim portion 88b cannot engage any one of resilient engaging arms 89b.

For manual focus adjustment manual focusing ring 80 is shifted forwardly to the manual focusing position shown in FIGS. 12 and 14. Then resilient engaging arms 89b engage raised rim portion 88b and are elastically deformed by the raised rim portion as shown in FIG. 14. Due to the elastic deformation of the resilient engaging arms a frictional force is obtained which is strong enough to couple coupling member 89 with interlocking ring 88. Accordingly when manual focusing ring 80 is rotated, the interlocking ring is also rotated together with rotatable sleeve 28 to adjust the optical system for focusing. At this time it should be understood that driven shaft 15 is disengaged from driving shaft 13 because interlocking member 100 shifts the driven shaft fowardly in response to the shift of the manual focusing ring to the manual focusing position. Therefore the rotation of rotatable sleeve 28 is not transmitted to driving shaft 13 though it is transmitted up to driven shaft 15. This makes it possible to rotate the manual focusing ring without application of an additonal force required for driving the driving force transmission and motor M of automatic focusing device 1 and prevents generation of unpleasant sounds by the driving of the driving force transmission and generation of electromotive force by the driving of the motor. Additionally it becomes possible to use a speed reduction device of one-way force transmission type in the driving force transmission.

Moreover, when driven shaft 15 is disengaged from driving shaft 13 as described above, driving force of motor M is not transmitted to the driven shaft even if motor M is driven because of any cause. Accordingly it is recommended to shift manual focusing position soon after completion of the automatic focus adjustment if the focus condition achieved by the automatic focus adjustment is not to be disturbed as in the case of continuous photographing with the aimed object unchanged. Thus it provides the same effect as focus lock.

In the case of the manual focus adjustment, it will be preferrable if a camera operator can know the camera-to-object distance to which the optical system is adjusted, by reading a distance scale. To this end a distance scale 103 is provided on the outer peripheral surface of manual focusing ring 80 in the circular direction and an index point 104 is provided on the outer peripheral surface of stationary barrel 27. In reading the scale, the manual focusing ring is at first rotated at the manual focusing position to either of the near extreme distance position where pin 95 engages one of stoppers 94 or the infinity distance position where pin 95 engages the other of stoppers 94. Successively the manual focusing ring is further rotated in the same direction until index point 104 points one of distance graduations of distance scale 103 which represents the near extreme distance or the infinity distance. During this further rotation of the manual focusing ring, resilient engaging arms 89b slip over raised rim position 88b of interlocking ring 88 since rotation of the interlaching ring is prevented by the engagement of pin 95 with either one of stoppers 94. By the above operation of the manual focusing ring a particular relationship is established between the manual focusing ring and rotatable ring 28 such that the distance represented by the graduation pointed by index point 104 becomes to correspond to the distance to which the optical system is adjusted. Therefore, even if the manual focusing ring is rotated thereafter in the direction separating pin 95 from the stopper which the pin has engaged, the particular relationship is maintained and the distance to which the optical system is adjusted is indicated by the graduation pointed by index point 104.

Figure 17:
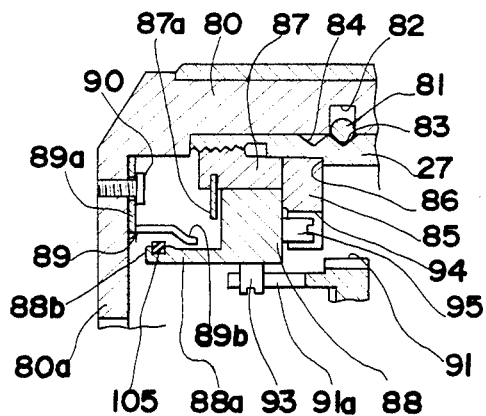
FIGS. 17 and 18 are enlarged fragmentary sectional views of a lens assembly according to a fourth embodiment of the present invention, which is shown in the condition set for automatic focus adjustment in FIG. 17 and in the condition set for manual focus adjustment in FIG. 18.
Figure 18:
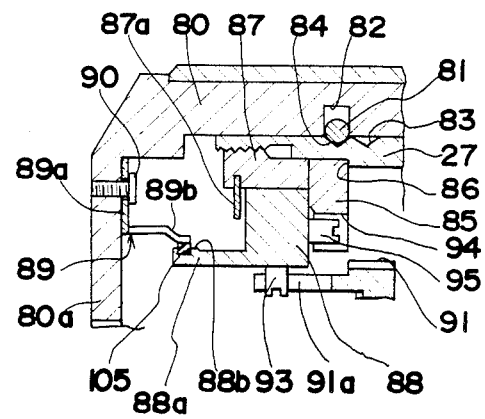

The lens assembly according to the fourth embodiment of the present invention is shown in FIGS. 17 and 18. In this lens assembly raised rim portion 88b of forwardly extending sleeve 88a of interlocking ring 88 is formed with a circular groove receiving a circular resilient friction member 105 made of a resilient material such as a rubber having a large coefficient of friction. Resilient engaging arms 89b ride on and fictionally engage this friction member to ensure the transmission of the rotation of manual focusing ring 80 to interlocking ring 88 when the manual focusing ring is shifted to the manual focusing position as shown in FIG. 18.

Figure 19:
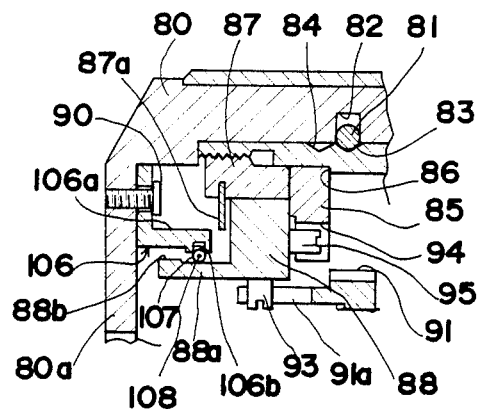
FIGS. 19 and 20 are enlarged fragmentary sectional views of a lens assembly according to a fifth embodiment of the present invention, which is shown in the condition set for automatic focus adjustment in FIG. 19 and in the condition set for manual focus adjustment in FIG. 20.
Figure 20:
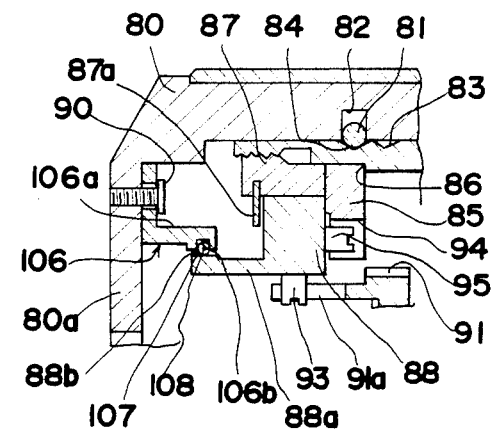
Figure 21:
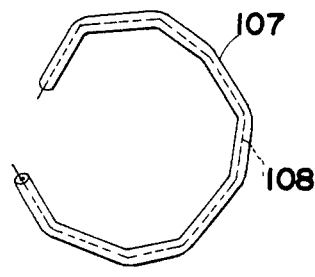
FIG. 21 is a perspective view of a resilient member used in the fifth embodiment.

In the lens assembly according to the fifth embodiment of the present invention shown in FIGS. 19 to 21, a coupling member 106 made of a rigid material is secured to the rear wall of brim 80a of manual focusing ring 80 by screw 90. This coupling member is L-shaped in cross-section as shown in FIGS. 19 and 20 and formed with a rearwardly extending engaging arm 106a having a circular groove 106b at its inner peripheral surface. Fitted in this circular groove 106b is a polygonal resilient friction member 107 which is made of a resilient material such as a rubber having a large coefficient of friction and which is opened at its opposite ends. Additionally friction member 107 is formed as a tube and a spring 108 is inserted therein as a core as shown in FIG. 21. When manual focusing ring 80 is shifted to the manual focusing position as shown in FIG. 20, the friction member rides on and frictionally engages raised rim portion 88b of forwardly extending sleeve 88a of interlocking ring 88 so that the manual focusing ring to which coupling member 106 is secured is frictionally coupled with the interlocking ring. At this time spring 108 serves to strengthen the frictional engagement between friction member 107 and raised rim portion 88b of forwardly extending sleeve 88a of interlocking ring 88. In contrast, with manual focusing ring 80 being at the automatic focusing position as shown in FIG. 19, no substantial engagement occurs between the friction member and the raised rim portion. In order to prevent friction member 107 from slipping in circular groove 106a as manual focusing ring 80 is rotated at the manual focusing position, the fitting between friction member 107 and circular groove 106b is designed such that stronger friction is created between the friction member and the circular groove than between the friction member and the raised rim portion. Alternatively stoppers which engage the opposite open ends of friction member 107 may be provided in circular groove 106b.

Figure 22:
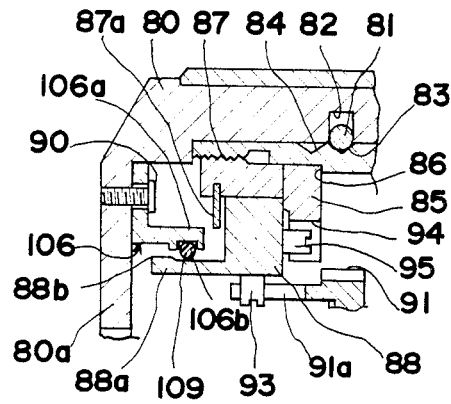
FIGS. 22 and 23 are enlarged fragmentary cross sectional view of a lens assembly according to a sixth embodiment of the present invention, which is shown in the condition set for automatic focus adjustment in FIG. 22 and in the condition set for manual focus adjustment in FIG. 23.
Figure 23:
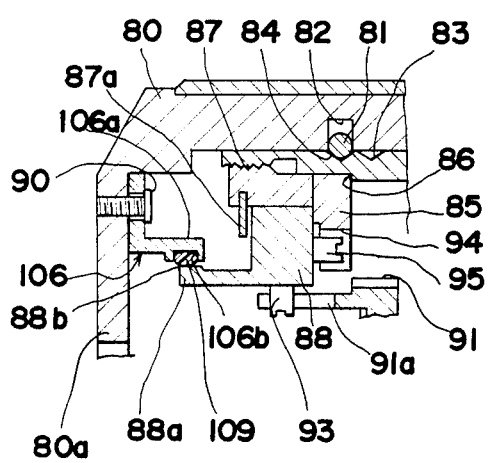
Figure 24:
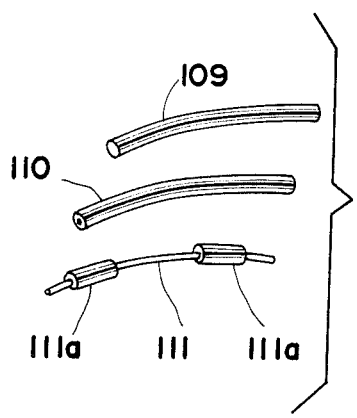
FIG. 24 is a perspective view of three resilient members which may be selectively used in the sixth embodiment.

FIGS. 22 and 23 show the lens assembly according to the sixth embodiment of the present invention in which one of resilient friction members 109, 110 and 111 shown in FIG. 24 is fitted in circular groove 106b of rearwardly extending arm 106a of coupling member 106. Resilient friction members 109 and 110 are made of a resilient material having a high coefficient of friction and formed as an elongation strip having a uniform diameter and a tube respectively. Resilient friction member 111 is also made of a resilient material having a high coefficient of friction and formed as an elongated strip having equally spaced large diameter portions 111a. When manual focusing ring 80 is shifted to the manual focusing position shown in FIG. 23, one of the resilient friction members fitted in circular groove 106b rides on raised rim portion 88b and is elastically deformed by being pressed from both upper and lower sides, so that strong engagement occurs due to the friction created between the resilient friction member and the raised rim portion as well as due to the restoring force of the resilient friction member.

Figure 25:
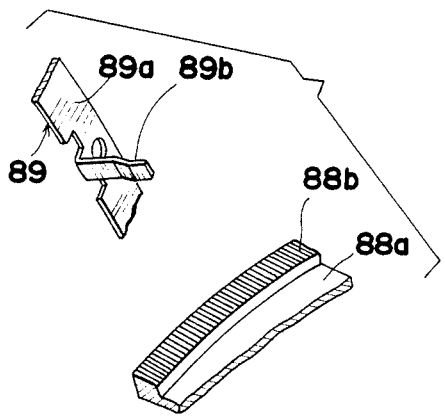
FIG. 25 is a schematic perspective view of a resilient member and a coupling member used in a lens assembly according to a seventh embodiment of the present invention.
Figure 26:
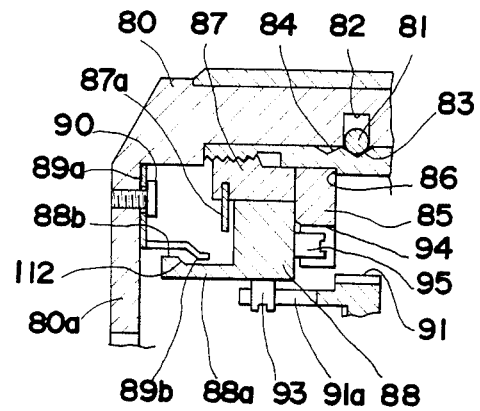
FIG. 26 to 28 are enlarged fragmentary cross sectional views of the lens assembly according to an eighth embodiment of the present invention, which is shown in the condition set for automatic focus adjustment in FIG. 26, in the condition set for manual focus adjustment with a manual focusing ring incompletely coupled with a focus adjusting mechanism in FIG. 27 and in the condition set for manual focus adjustment with the manual focusing ring completely coupled with the focus adjusting mechanism in FIG. 28.

Coupling member 89 and forwardly extending sleeve 88a of interlocking ring 88 of the lens assembly according to a seventh embodiment of the present invention are shown in FIG. 25. Raised rim portion 88b of the forwardly extending sleeve is formed with a number of fine stripe grooves, each extending parallel to the optical axis. Such fine stripe grooves may be formed on resilient engaging arms 89b of coupling member 89. This ensures stronger frictional engagement between the resilient engaging arms and the raised rim portion.

Figure 27:
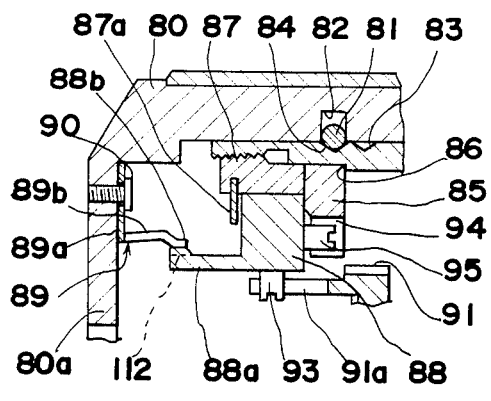
Figure 28:
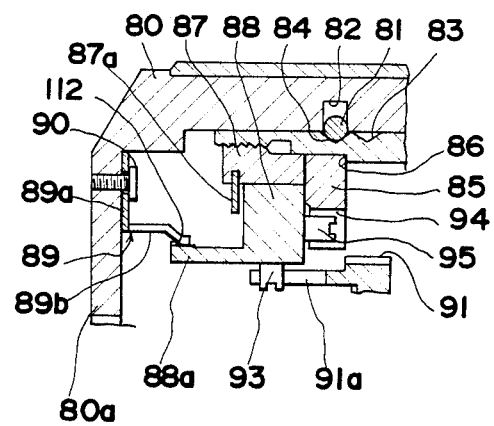
Figure 29:
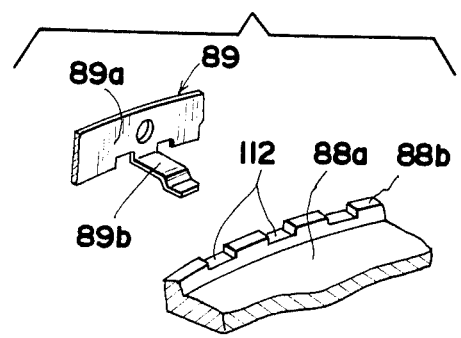
FIG. 29 is an exploded perspective view of a resilient member and an interlocking ring used in the eighth embodiment.
Figure 30:
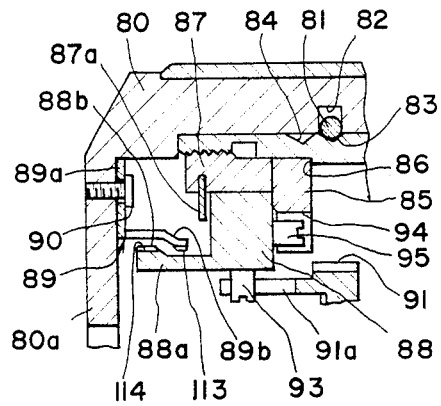
FIGS. 30 to 32 are enlarged fragmentary cross sectional views of the lens assembly according to a ninth embodiment of the present invention, which is shown in the condition set for automatic focus adjustment in FIG. 30, in the conditon set for manual focus adjustment with a manual focusing ring incompletely coupled with a focus adjusting mechanism in FIG. 31 and in the condition set for manual focus adjustment with the manual focusing ring completely coupled with the focus adjusting mechanism.

FIGS. 26 to 29 show the lens assembly according to an eighth embodiment of the present invention in which a plurality of equally spaced rectangular grooves or recesses 112 are formed on raised rim portion 88b of forwardly extending sleeve 88a of interlocking ring 88. It depends upon the rotational position of manual focusing ring 80 whether or not resilient engaging arms 89b can just engage the rectangular grooves or recesses when manual focusing ring 80 is shifted from the automatic focusing position shown in FIG. 26 to the manual focusing position shown in FIG. 28, and there will occur a case where the resilient engaging arms face the projections between the adjacent rectangular grooves or recesses. Even in such a case, however, resilient engaging arms 89b ride on the projections and are elastically deformed thereby as shown in FIG. 27. When the manual focusing ring is rotated slightly thereafter, at least one of the resilient engaging arms drops in the rectangular grooves or recesses as shown in FIG. 28, so that the coupling between coupling member 89 and interlocking ring 88 is completed to ensure the transmission of the rotation of manual focusing ring 80 to the interlocking ring.

The maximum idle rotation angle required for manual focusing ring 80 to have resilient engaging arms 89b drop in rectangular grooves or recesses 112 depends upon the number of the resilient engaging arms and that of the rectangular grooves or recesses. For example, it is about 3°13′ if the number of the resilient engaging arms is seven and that of the rectangular grooves or recesses is thirty-two. In this connection it is possible to have some of the resilient engaging arms drop in the rectangular grooves or recesses at the same time. The more the number of the resilient engaging arms which drop in the rectangular grooves or recesses at the same time is, the steadier the transmission of the rotation of the manual focusing ring to the interlocking ring is. However, the transmission is possible even if the number of the resilient engaging arms which drop in the rectangular grooves or recesses is only one.

Figure 31:
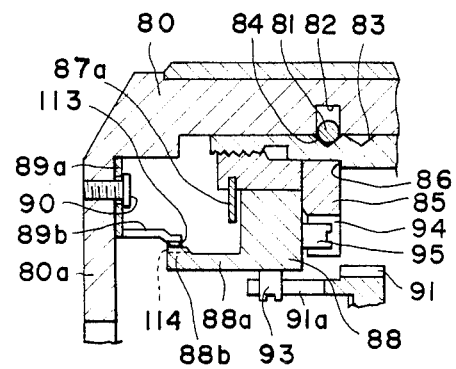
Figure 32:
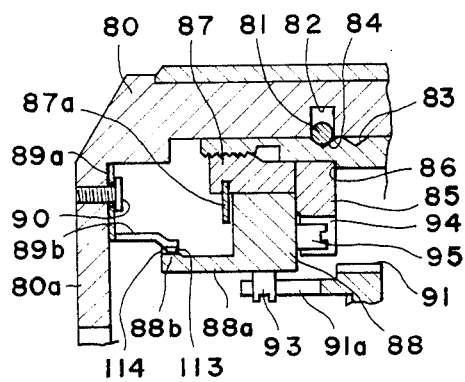
Figure 33:
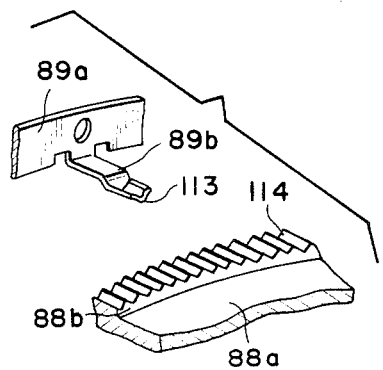
FIGS. 33 is an exploded perspective view of a resilient member and a coupling member used in the ninth embodiment.

The lens assembly according to the ninth embodiment of the present invention shown in FIGS. 30 to 33 is constructed to minimize the idle rotation angle required for manual focusing ring 80 to complete the coupling between coupling member 89 and interlocking ring 88. As best shown in FIG. 33, resilient engaging arms 89b of coupling member 89 are formed with a V shape engaging portion 113 at its rear end and raised rim portion 88b of forwardly extending sleeve 88a of interlocking ring 88 is formed with V shape grooves 114 engageable with the V shape engaging portions. These configurations minimize the probability that engaging portions 113 face the projecting portions of grooves 114 when manual focusing ring 80 is shifted from the automatic focusing position shown in FIG. 30 to the manual focusing position shown in FIG. 32. In this connection, even if engaging portions 113 face the projecting portions of grooves 114, they are elastically deformed by the projecting portions as shown in FIG. 31 and slip off from the projecting portions to drop in the grooves soon after manual focusing ring 80 begins to be rotated. Accordingly, there is almost no idle rotation of the manual focusing ring and operation efficiency of the same ring is improved. Moreover the transmission of the rotation of the manual focusing ring to the interlocking ring becomes steadier in this case than in the case where it is effected only through frictional engagement of the coupling member with the interlocking ring.

When manual focusing ring 80 is rotated for focus adjustment beyond the normal distance range, V shape engaging portions 113 ride on the projecting portions of V shape groove 114, providing a relatively strong resistance against the rotation of the manual focusing ring. This becomes a warning against excessive operation of the manual focusing ring for focus adjustment.

Figure 34:
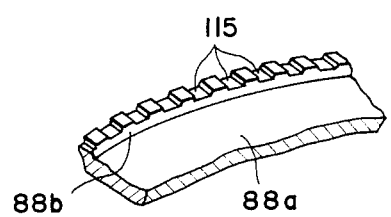
FIG. 34 is a perspective view of another coupling member modified from that of FIG. 33.

Meanwhile V shape grooves 114 may be replaced with rectangular grooves or recesses 115 as shown in FIG. 34. In this case the operation is almost the same as in the case of the eighth embodiment.

Figure 35:
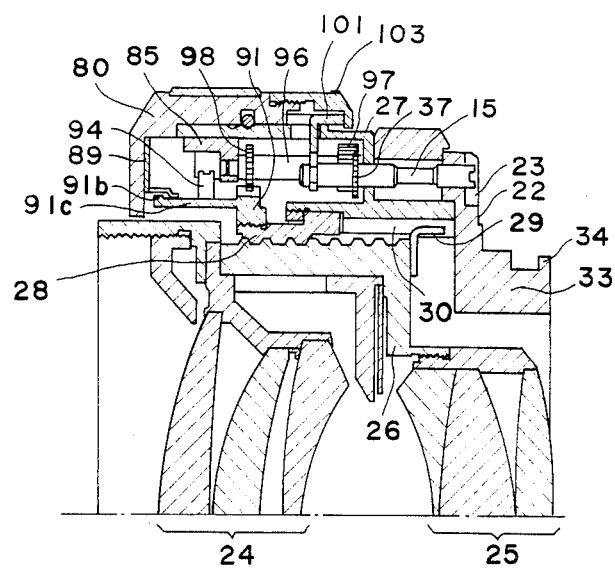
FIGS. 35 and 36 are longitudinal cross sectional views, with a lower half omitted, of a lens assembly according to a tenth embodiment of the present invention, which is shown in the condition set for automatic focus adjustment in FIG. 35 and in the condition set for manual focus adjustment in FIG. 36.
Figure 36:
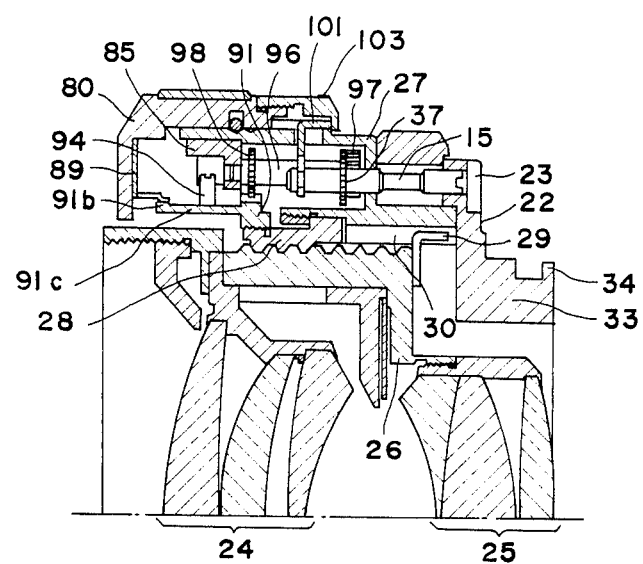

FIGS. 35 and 36 show the lens assembly according to a tenth embodiment of the present invention in which interlocking ring 88 is omitted and in which raised rim portion 91b engageable with resilient engaging arms 89b of coupling member 89 is formed at the front end of a forwardly extending sleeve 91c of gear 91. When manual focusing ring 80 is shifted to the manual focusing position shown in FIG. 36, resilient engaging arms 89b frictionally engage raised rim portion 91b, coupling the manual focusing ring with gear 91. Accordingly, gear 91 can be rotated in response to rotation of the manual focusing ring and the manual focus adjustment of the optical system is effected in the same manner as in the case of the automatic focus adjustment. In this embodiment, stopper pin 94 is planted on the outer peripheral surface of the forwardly extending sleeve of gear 91. The construction of this embodiment for coupling manual focusing ring 80 with gear 91 may be modified to those of the fourth to ninth embodiments for coupling manual focusing ring 80 with interlocking ring 88.

Although various preferred embodiments have been described with reference to the accompanying drawings, it should be understood that the present invention is not limited thereto but further variations or modifications will be made without departing from the spirit of the present invention. For example, the focus adjusting mechanism is not necessarily of the double helicoid threads type but may be of any other known type. Additionally disengaging driven shaft 15 from driving shaft 13 is not the only way to interrupt the transmission of the rotation of the driving shaft to the focus adjusting mechanism in the case of the manual focus adjustment but it is also possible to disengage gear 37 from gear 97 or to disengage gear 98 from gear 91. Furthermore driving shaft 13 and driven shaft 15 are arranged such that their engaging ends are located in mount surfaces 10 and 22 respectively in the preferred embodiments but another arrangement is possible in which the engaging ends of the driving and driven shafts are located in the vicinity of the mount surfaces, for example, at a radial position inside and close to bayonet pawls 3 and 34. Still further, the lens assembly of the present invention may be used with a projector body having a similar automatic focusing device as disclosed.

What is claimed is:

1. A lens assembly detachably mountable on an optical apparatus which includes an automatic focusing device whose output driving shaft has a front end located in or adjacent to a mount surface at the front of said optical apparatus, said lens assembly comprising:

a stationary barrel integrally provided with a mount surface contacting said mount surface at the front of said optical apparatus when said lens assembly is mounted on said optical apparatus;

an optical system adjustable for focusing;

a single focus adjusting mechanism for adjusting said optical system for focusinq;

a manual focusing ring manually operable for rotation relative to said stationary barrel about the optical axis of said optical system for operating said focus adjusting mechanism;

a driven mechanism driven by said output driving shaft for operating said focus adjusting mechanism, said driven mechanism including a driven shaft having a rear end located in or adjacent to said mount surface of said lens assembly and shiftable relative to said stationary barrel in the direction parallel to the optical axis of said optical system between an engaging position wherein said rear end engages said front end of said output driving shaft and a disengaging position wherein said rear end disengages from said front end of said driving shaft, said rear end also disengaging from said front end of said output driving shaft even with said driven shaft being at said engaging position when said lens assembly is detached from said optical apparatus;

a change-over member provided on said stationary barrel separately from said manual focusing ring and manually operable between a manual focusing position and an automatic focusing position; and means, interlocking said change-over member with said driven shaft, for shifting said driven shaft to said engaging position in response to the manual operation of said change-over member to said automatic focusing position and to said disengaging position in response to the manual operation of said change-over member to said manual focusing position.

2. A lens assembly as defined in claim 1, wherein said focus adjusting mechanism includes a member integrally provided with said manual focusing ring and having helicoid threads.

3. A lens assembly as defined in claim 1, wherein said manual focusing ring has a diameter which is smaller than that of said stationary barrel and is located at the front of said lens assembly to be partially covered by said stationary barrel.

4. A lens assembly as defined in claim 3, further comprising means for restricting the rotational range of said manual focusing ring.

5. A lens assembly as defined in claim 1, further comprising means for urging said driven shaft forwardly and wherein said coupling means includes a cam member coupled to said changeover member and having first and second cam surfaces abutting the front end of said driven shaft to position said driven shaft at said engaging and disengaging positions respectively against the force of said urging means.

6. A lens assembly as defined in claim 5, wherein said changeover means includes a knob rotatably supported on said stationary barrel and said cam member is fixed to said knob eccentrically from the rotational axis of said knob.

7. A lens assembly as defined in claim 5, wherein said cam member is formed as a ring supported on said stationary barrel for rotation about the optical axis of said optical system.

8. A lens assembly detachably mountable on an optical apparatus which includes an automatic focusing device whose output driving shaft has a front end located in or adjacent to a mount surface at the front of said optical apparatus, said lens assembly comprising:
- a stationary barrel integrally provided with a mount surface contacting said mount surface at the front of said optical apparatus when said lens assembly is mounted on said optical apparatus;
- an optical system adjustable for focusing;
- a single focus adjusting mechanism for adjusting said optical system for focusing;
- a manual focusing ring manually operable for rotation relative to said stationary barrel about the optical axis of said optical system, said manual focusing ring being also operable for movement relative to said stationary barrel in the direction parallel to the optical axis of said optical system bewteen a manual focusing position and an automatic focusing position;
- a driven mechanism driven by said driving shaft for operating said focus adjusting mechanism, said driven mechanism including a driven shaft having a rear end located in or adjacent to said mount surface of said lens assembly and shiftable relative to said stationary barrel in the direction parallel to the optical axis of said optical system between an engaging position wherein said rear end engages said front end of said driving shaft and a disengaging position wherein said rear end disengages from said front end of said driving shaft, said rear end also disengaging from said front end of said driving shaft even with said driven shaft being at said engaging position when said lens assembly is detached from said optical apparatus;
- means interlocking said manual focusing ring with said driven shaft for shifting said driven shaft to said engaging position in response to the movement of said manual focusing ring to said automatic focusing position and to said disengaging position in response to the movement of said manual focusing ring to said manual focusing position; and
- means for releasably coupling said manual focusing ring with said focus adjusting mechanism, said coupling means including a resilient member which is elastically deformed to achieve frictional engagement between said manual focusing ring and said focus adjusting mechanism only when said manual focusing ring is moved to said manual focusing position.

9. A lens assembly as defined in claim 8, wherein said resilient member includes a coupling member having at least one resilient arm and secured to said manual focusing ring, and said focus adjusting mechanism includes an interlocking member rotatable relative to said stationary barrel about the optical axis of said optical system for the operation of said focus adjusting mechanism, said resilient member being elastically deformed by said interlocking member for frictional engagement with the same only with said manual focusing ring being at said manual focusing position.

10. A lens assembly as defined in claim 9, further comprising a friction member held by said interlocking member to engage said resilient arm only with said manual focusing ring being at said manual focusing position.

11. A lens assembly as defined in claim 9, wherein said interlocking means includes a plurality of grooves arranged angularly at different positions about the optical axis of said optical system and extending parallel to the optical system, said resilient engaging arm being engageable with said grooves only with said manual focusing ring being at said manual focusing position.

12. A lens assembly as defined in claim 8, wherein said coupling means includes a rigid coupling member holding said resilient member and secured to said manual focusing ring, and said focus adjusting mechanism includes an interlocking member rotatable relative to said stationary barrel about the optical axis of said optical system for the operation of said focus adjusting mechanism, said resilient member being elastically deformed by said interlocking member for frictional engagement with the same only with said manual focusing ring being at said manual focusing position.

13. A lens assembly as defined in claim 12, said resilient member is made of a resilient material having high coefficient of friction.

14. A lens assembly as defined in claim 13, further comprising a wire spring inserted in said resilient member.

* * * * *